US009983862B2

United States Patent
Jana et al.

(10) Patent No.: US 9,983,862 B2
(45) Date of Patent: May 29, 2018

(54) SYSTEMS AND METHODS FOR DOWNLOAD AND INSTALLATION OF DRIVERS FOR UNMANAGED INFORMATION HANDLING RESOURCES

(71) Applicant: Dell Products L.P., Round Rock, TX (US)

(72) Inventors: Ananya Jana, West Bengal (IN); Alluri Srinivas, Andhra Pradesh (IN); Pandiyan Varadharajan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days. days.

(21) Appl. No.: 14/623,159

(22) Filed: Feb. 16, 2015

(65) Prior Publication Data

US 2016/0239285 A1    Aug. 18, 2016

(51) Int. Cl.
*G06F 9/445* (2018.01)
*H04L 29/08* (2006.01)
*G06F 9/44* (2018.01)

(52) U.S. Cl.
CPC .............. *G06F 8/61* (2013.01); *G06F 9/4411* (2013.01); *H04L 67/34* (2013.01)

(58) Field of Classification Search
None
See application file for complete search history.

(56) References Cited

U.S. PATENT DOCUMENTS

| 5,579,529 | A | * | 11/1996 | Terrell | G06F 9/4411 710/8 |
| 2005/0038927 | A1 | * | 2/2005 | Choi | G06F 9/4415 710/8 |
| 2006/0218248 | A1 | * | 9/2006 | Shiina | H04L 63/08 709/219 |
| 2011/0255122 | A1 | * | 10/2011 | Kato | G06F 8/61 358/1.14 |

* cited by examiner

*Primary Examiner* — Qamrun Nahar
(74) *Attorney, Agent, or Firm* — Jackson Walker L.L.P.

(57) ABSTRACT

In accordance with embodiments of the present disclosure, an information handling system may include a processor and an operating system embodied in a non-transitory computer-readable medium communicatively coupled to the processor. The operating system may be configured to, when read and executed by the processor: read a base uniform resource locator (URL) associated with a vendor of a device communicatively coupled to the processor; append information to the base URL to generate a full download URL for an operating system driver associated with the device; and download the operating system driver from a file location defined by the full download URL.

16 Claims, 3 Drawing Sheets

SYSTEMS AND METHODS FOR DOWNLOAD AND INSTALLATION OF DRIVERS FOR UNMANAGED INFORMATION HANDLING RESOURCES

TECHNICAL FIELD

The present disclosure relates in general to information handling systems, and more particularly to systems and methods for downloading and installation of a driver for an unmanaged information handling resource.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Typically, many peripheral information handling resources in an information handling system require a driver which is a program of instructions configured to, when read and executed by a processor, provide a software interface between an operating system executing on the processor and firmware or hardware executing on an information handling resource to which the driver is associated. When an information handling resource is detected by an operating system and is not recognized by the operating system, the operating system may try to find the best available driver. If the operating system fails to find an applicable driver, a user must often manually search for the device driver for the device and download the driver from the web, which may be a time-consuming process and may be a bad customer experience.

SUMMARY

In accordance with the teachings of the present disclosure, the disadvantages and problems associated with downloading and installation of drivers for information handling resources may be substantially reduced or eliminated.

In accordance with embodiments of the present disclosure, an information handling system may include a processor and an operating system embodied in a non-transitory computer-readable medium communicatively coupled to the processor. The operating system may be configured to, when read and executed by the processor: read a base uniform resource locator (URL) associated with a vendor of a device communicatively coupled to the processor; append information to the base URL to generate a full download URL for an operating system driver associated with the device; and download the operating system driver from a file location defined by the full download URL.

In accordance with these and other embodiments of the present disclosure, a method may include reading a base uniform resource locator (URL) from a configuration header file of a device. The method may also include appending information to the base URL to generate a full download URL for an operating system driver associated with the device. The method may further include downloading the operating system driver from a file location defined by the full download URL.

In accordance with these and other embodiments of the present disclosure, a device may include a non-transitory computer-readable medium having stored thereon a base uniform resource locator (URL), wherein the base URL comprises at least a portion of a full download URL for downloading an operating system driver associated with the device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1A:
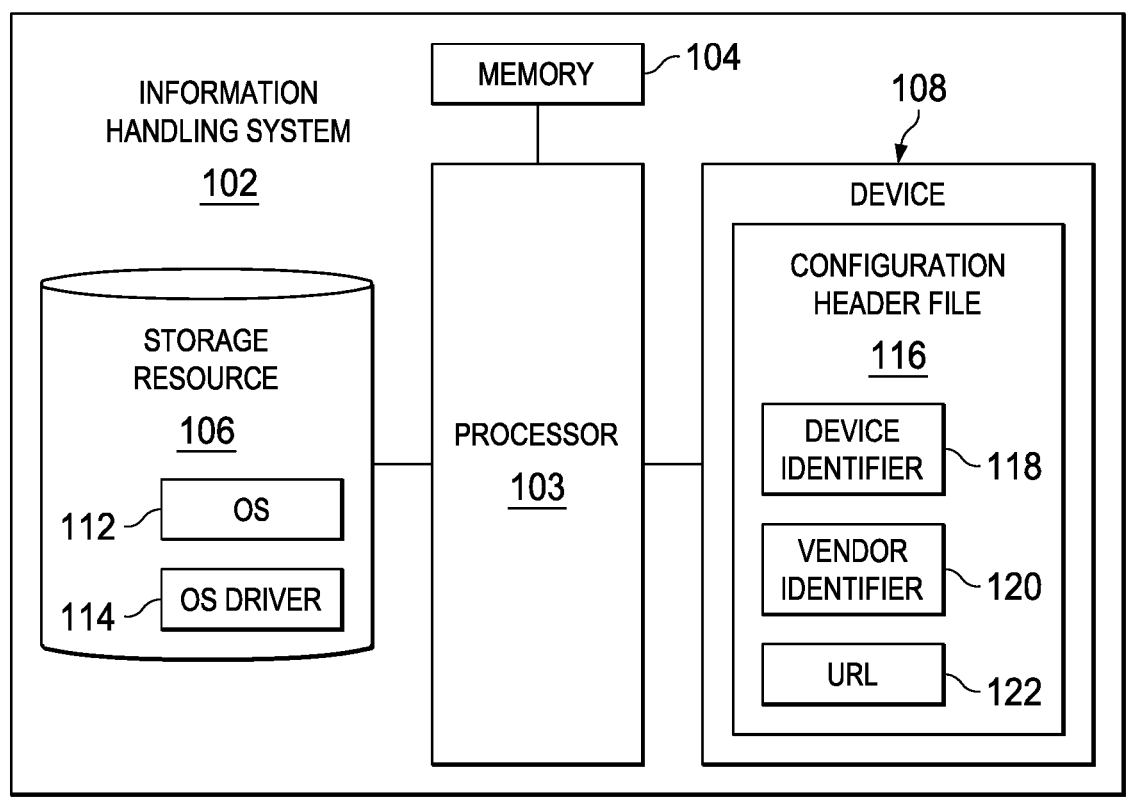
FIG. 1A illustrates a block diagram of an example information handling system, in accordance with the present disclosure.
Figure 1B:
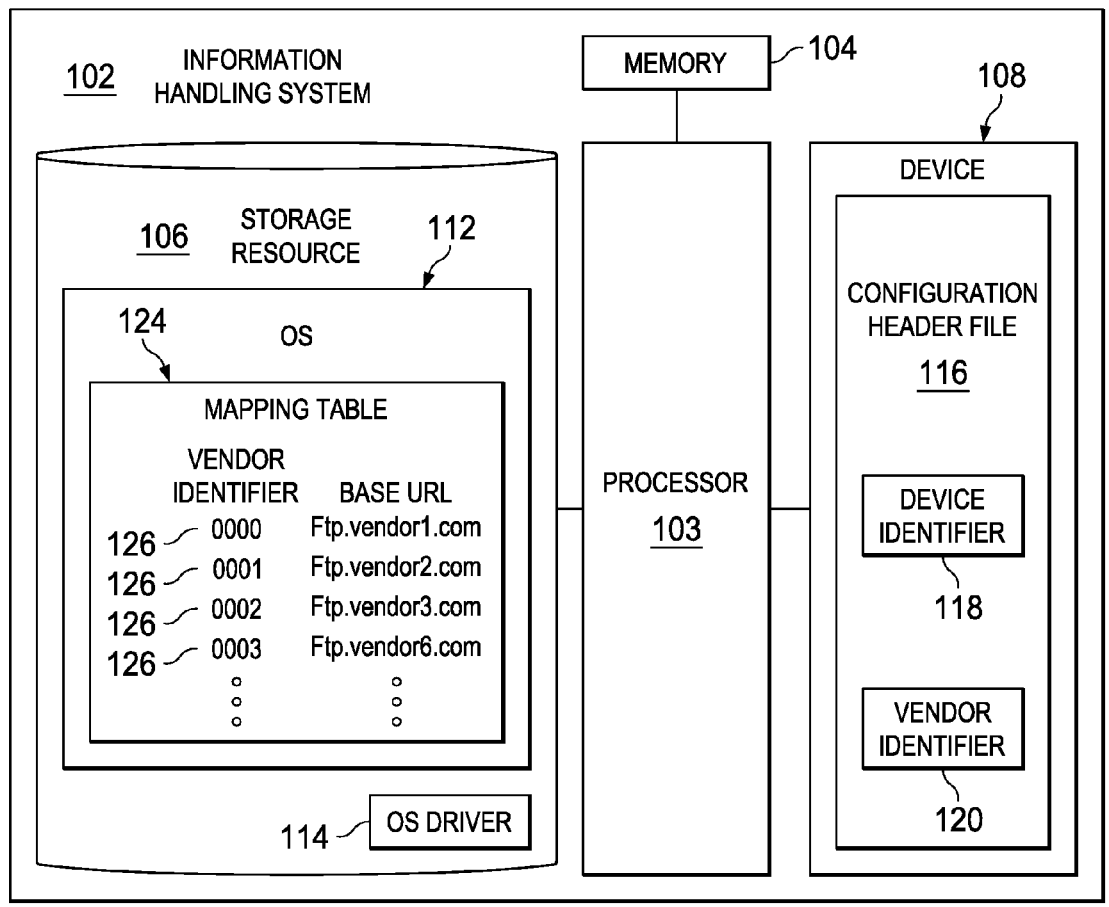
FIG. 1B illustrates a block diagram of another example information handling system, in accordance with the present disclosure.
Figure 2:
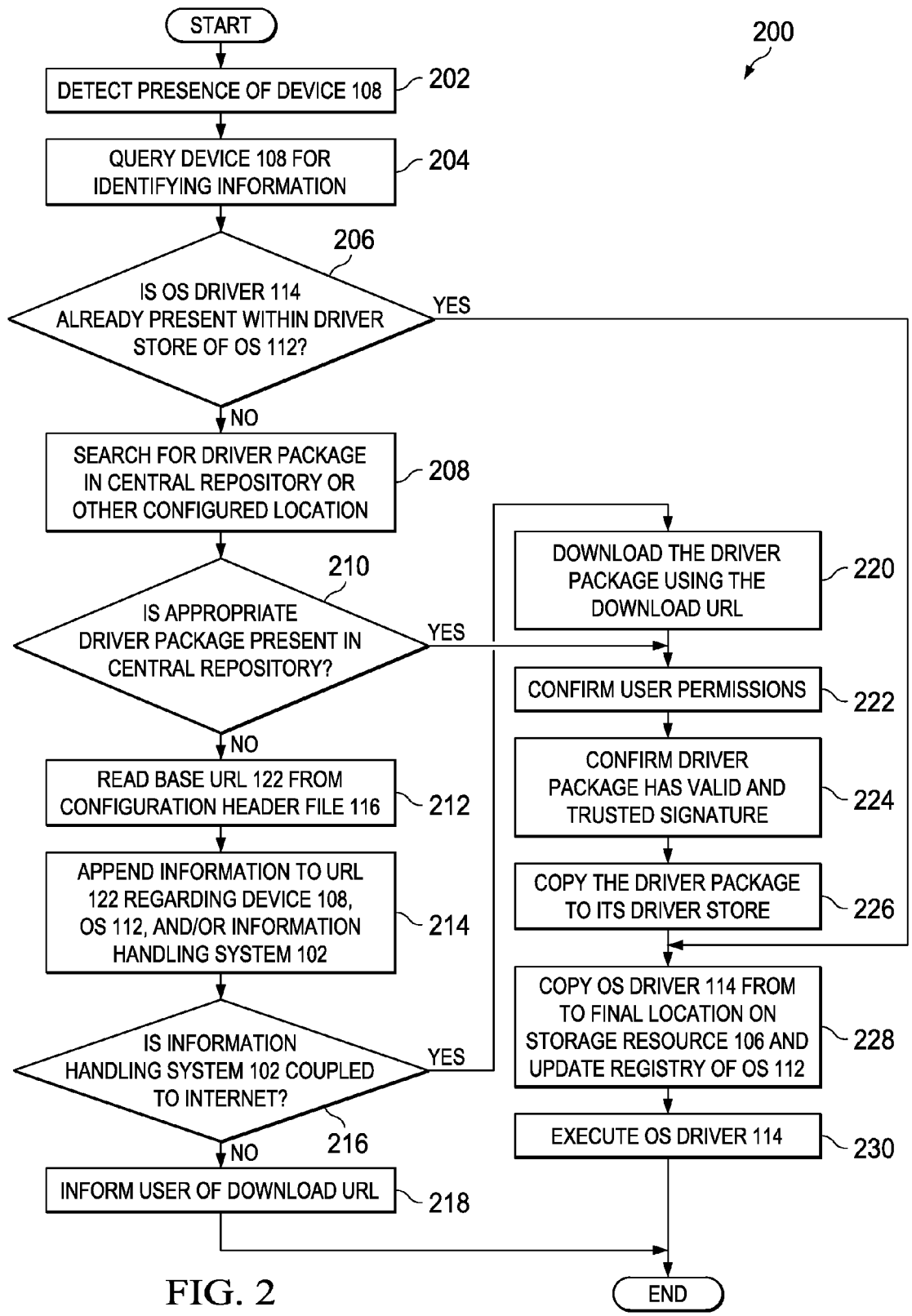
FIG. 2 illustrates a flow chart of an example method for download and installation of drivers for an unmanaged device, in accordance with embodiments of the present disclosure.

Preferred embodiments and their advantages are best understood by reference to FIGS. 1A through 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1A illustrates a block diagram of an example information handling system 102, in accordance with the present disclosure. In some embodiments, information handling system 102 may comprise a server chassis configured to house a plurality or servers or "blades." In other embodiments, information handling system 102 may comprise a personal computer (e.g., a desktop computer, laptop computer, mobile computer, and/or notebook computer). In yet other embodiments, an information handling system 102 may be a portable computing device (e.g., a laptop, notebook, tablet, handheld, smart phone, personal digital assistant, etc.). In yet other embodiments, information handling system 102 may comprise a storage enclosure configured to house a plurality of physical disk drives and/or other computer-readable media for storing data. As shown in FIG. 1A, information handling system 102 may comprise a processor 103, a memory 104 communicatively coupled to processor 103, a storage resource 106 communicatively coupled to processor 103, and one or more devices 108 communicatively coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EE-PROM), a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 104 and may include any system, device, or apparatus operable to store information processed by processor 103. Storage resource 106 may include, for example, network attached storage, one or more direct access storage devices (e.g., hard disk drives), and/or one or more sequential access storage devices (e.g., tape drives). As shown in FIG. 1A, storage resource 106 may have stored thereon an operating system (OS) 112, and one or more OS drivers 114.

OS 112 may comprise any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 112. Active portions of OS 112 may be transferred to memory 104 for execution by processor 103.

An OS driver 114 may comprise any program of instructions configured to, when read and executed by processor 103, provide an interface between OS 112 and hardware or firmware executing on an information handling resource (e.g., a device 108).

A device 108 may be communicatively coupled to processor 103 and may generally include any information handling resource. In some embodiments, device 108 may comprise a Peripheral Component Interconnect (PCI) or PCI Express (PCIe) device. As shown in FIG. 1A, a device 108 may include thereon (e.g., stored in a non-volatile memory or other computer-readable medium integral to device 108) a configuration header file 116. Configuration header file 116 may include various information identifying or otherwise regarding device 108 that may aid or assist in configuring device 108 and/or OS 112 for interoperation. For example, in embodiments in which device 108 comprises a PCI or PCIe device, configuration header file 116 may comprise a PCI configuration header file having stored thereon a device identifier 118 identifying a device type or model for device 108, a vendor identifier 120 identifying a vendor of device 108, and/or other information regarding device 108. In these and other embodiments, configuration header file 116 may also include a uniform resource locator (URL) 122 which includes at least a portion of a full URL from which a driver for the device 108 may be downloaded by OS 112. In embodiments in which configuration header file 116 is a PCI configuration header file, URL 122 may be stored within a reserved data field of the PCI configuration header file.

For example, a vendor may store in URL 122 a base URL with minimal details, such as "ftp.dell.com" for example. In operation, OS 112 may retrieve such URL 122 from device 108 in order to create a full download URL for the driver based on one or more characteristics of OS 112 and/or device 108. For example, OS 112 may append to URL 122 information regarding device identifier 118 and the type, version, and/or architecture (e.g., 32-bit, 64-bit) of OS 112. Thus example, OS 112 may determine a full download URL to be "<scheme name>://<base URL>/<device ID>/<OS version>/<OS architecture>", or something similar, where scheme name identifies the protocol or other scheme defining how a resource is to be retrieved (e.g., values for "<scheme name>" may be "http," https" or "ftp"), "<base URL>" is the value stored as and retrieved from URL 122, "<device ID>" is the value stored and retrieved from device identifier 118, "<OS version>" is the version of OS 112, and "<OS architecture>" is an architecture of OS 112. As a specific example, assuming a value of URL 122 to be "ftp.dell.com", the value in device identifier 118 is "1432", OS 112 is a 64-bit version of Windows 2008, the full download URL generated by OS 112 may be "ftp://ftp.dell.com/1432/Win2k8/x64". In addition, vendors of devices 108 may maintain a backend mapping table that will redirect the URL generated by OS 112 to the appropriate download location on the vendor's public download server.

In many instances the value in vendor identifier 120 may not be used, as the base URL stored in URL 122 may be unique to each vendor. However, in embodiments in which a centralized repository for device drivers from many vendors is to be used for download, then OS 112 may append information to the URL based on vendor identifier 120 in order to create the full download URL.

As shown in FIG. 1B, in these and other embodiments, a base URL for a device 108 may not be stored in a configuration header file 116 of such device 108, but may instead be stored within a mapping table 124 or other data structure of OS 112 which includes one or more entries 126 wherein each entry 126 maps a vendor identifier 120 for a device to a base URL associated with such vendor identifier. Thus, when creating a full download URL for an OS driver 114 for such a device, OS 112 may create the full download URL by appending to the base URL stored in mapping table 124 information regarding device identifier 118 and the type, version, and/or architecture (e.g., 32-bit, 64-bit) of OS 112.

In addition to processor 103, memory 104, storage resource 106, and device(s) 108, information handling system 102 may include one or more other information handling resources.

FIG. 2 illustrates a flow chart of an example method 200 for download and installation of drivers for an unmanaged device 108, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, in response to installation of a device 108, OS 112 may detect the presence of device 108. At step 204, plug-and-play functionality or similar functionality of OS 112 may query device 108 for identifying information (e.g., device identifier 118 and vendor identifier 120). At step 206, OS 112 may, based on the identifying information, determine if an OS driver 114 is already present within a driver store of OS 112. If an OS driver 114 for device 108 is already present within a driver store of OS 112, method 200 may proceed to step 228. Otherwise, method 200 may proceed to step 208.

At step 208, in response to OS 112 determining an OS driver 114 for device 108 is not present within a driver store of OS 112, OS 112 may search for a driver package in a central repository or other configured location (e.g., on a network accessible to information handling system 102). At step 210, OS 112 may determine if an appropriate driver package is present in the central repository. If an appropriate driver package is present in the central repository, method 200 may proceed to step 222. Otherwise, method 200 may proceed to step 212.

At step 212, in response to OS 112 determining that an appropriate driver package is not present in the central repository, OS 112 may read base URL 122 from configuration header file 116. In embodiments in which base URLs are not stored within a configuration header file of a device, the base URL may instead be read from a mapping table or other data structure of OS 112 based on a vendor identifier of such device. At step 214, OS 112 may append information to the base regarding device 108 (e.g., device identifier 118), OS 112 (e.g., OS type, version, and/or architecture), and/or information handling system 102 or components thereof to generate a full download URL for a driver package of device 108.

At step 216, OS 112 may determine whether information handling system 102 is coupled to the Internet. If coupled to the Internet, method 200 may proceed to step 220. Otherwise, method 200 may proceed to step 218.

At step 218, in response to determining that information handling system 102 is not coupled to the Internet, OS 112 may inform a user of information handling system 102 (e.g., via a user interface of information handling system 102) of the download URL, so that the user may later use such URL to download the driver package when information handling system 102 is coupled to the Internet. After completion of step 218, method 200 may end.

At step 220, in response to determining that information handling system 102 is coupled to the Internet, OS 112 may issue an appropriate command to download the driver package using the download URL.

At step 222, OS 112 may determine whether the user of information handling system 102 has appropriate permissions for downloading the driver package from the location identified by the download URL and/or has permissions to access the central repository. At step 224, responsive to determining that such permission exists, OS 112 may confirm that the driver package has a valid and trusted signature. At step 226, responsive to confirming the driver package has a valid and trusted signature, OS 112 may copy the driver package to its driver store.

At step 228, plug-and-play functionality or similar functionality of OS 112 may copy OS driver 114 from the driver store to its final location on storage resource 106, and may also appropriately update a registry of OS 112 to indicate that OS driver 114 is the driver for device 108.

At step 230, plug-and-play functionality or similar functionality of OS 112 may execute OS driver 114 to render device 108 operable with OS 112. After completion of step 230, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor; and
    an operating system embodied in a non-transitory computer-readable medium communicatively coupled to the processor, the operating system configured to, when read and executed by the processor:
        obtain a vendor identifier from a configuration header file of a peripheral components interface (PCI) or PCI express (PCIe) device communicatively coupled to the processor;
        identify, based on the vendor identifier, a particular entry of a mapping table data structure as a base uniform resource locator (URL) source;
        read, from the base URL source, a base URL associated with the PCI or PCIe device;
        append information to the base URL to generate a full download URL for an operating system driver associated with the PCI or PCIe device; and
        download the operating system driver from a file location defined by the full download URL.

2. The information handling system of claim 1, wherein the information appended to the base URL comprises information regarding the PCI or PCIe device.

3. The information handling system of claim 1, wherein the information appended to the base URL comprises information regarding the operating system.

4. The information handling system of claim 3, wherein the mapping table data structure comprises a data structure of the operating system.

5. The information handling system of claim 3, wherein the information regarding the operating system comprises information identifying a version of the operating system.

6. The information handling system of claim 3, wherein the information regarding the operating system comprises information identifying a processor architecture associated with the operating system.

7. The information handling system of claim 1, wherein the base URL is stored within a reserved data field of the PCI configuration header file.

8. A method comprising:
    obtaining a vendor identifier from a configuration header file of a peripheral components interface (PCI) or PCI express (PCIe) device communicatively coupled to the processor;
    identifying, based on the vendor identifier, a particular entry of a mapping table data structure as a base uniform resource locator (URL) source;
    reading, from the base URL source, a base URL associated with the PCI or PCIe device:
    appending information to the base URL to generate a full download URL for an operating system driver associated with the PCI or PCIe device; and
    downloading the operating system driver from a file location defined by the full download URL.

9. The method of claim 8, wherein the information appended to the base URL comprises information regarding the PCI or PCIe device.

10. The method of claim 8, wherein the information appended to the base URL comprises information regarding an operating system upon which the operating system driver is to execute.

11. The method of claim 10, wherein the mapping table data structure comprises a data structure within the operating system.

12. The method of claim 10, wherein the information regarding the operating system comprises information identifying a version of the operating system.

13. The method of claim 10, wherein the information regarding the operating system comprises information identifying a processor architecture associated with the operating system.

14. The method of claim 8, wherein the base URL is stored within a reserved data field of the configuration header file.

15. A non-transitory computer-readable medium having stored thereon processor-executable operating system instructions that, when executed by a processor, cause operations comprising:
    obtaining a vendor identifier from a configuration header file of a peripheral components interface (PCI) or PCI express (PCIe) device communicatively coupled to the processor;
    identifying, based on the vendor identifier, a particular entry of a mapping table data structure as a base uniform resource locator (URL) source;
    reading, from the base URL source, a base URL associated with the PCI or PCIe device;
    appending information to the base URL to generate a full download URL for an operating system driver associated with the PCI or PCIe device; and
    downloading the operating system driver from a file location defined by the full download URL.

16. The computer readable medium of claim 15, wherein the device comprises a peripheral component interconnect (PCI) device and the configuration header file comprises a PCI header file.

* * * * *